(12) United States Patent
Makaremi

(10) Patent No.: US 8,511,177 B1
(45) Date of Patent: Aug. 20, 2013

(54) BLADE CONDITION MONITORING SYSTEM

(76) Inventor: Shaw Shahriar Makaremi, Goleta, CA (US)

( * ) Notice: Subject to any disclaimer, the term of this patent is extended or adjusted under 35 U.S.C. 154(b) by 7 days.

(21) Appl. No.: 13/326,856

(22) Filed: Dec. 15, 2011

(51) Int. Cl.
*G01N 3/22* (2006.01)

(52) U.S. Cl.
USPC .......................................................... 73/847

(58) Field of Classification Search
USPC .......................................................... 73/847
See application file for complete search history.

(56) References Cited

U.S. PATENT DOCUMENTS

| | | | |
|---|---|---|---|
| 3,151,226 A | | 9/1964 | Jones et al. |
| 3,660,789 A | | 5/1972 | Weisenburger |
| 6,771,063 B2 | | 8/2004 | Stolfus |
| 7,348,683 B2 | | 3/2008 | Riesberg |
| 7,600,577 B2 | | 10/2009 | Simm et al. |
| 7,710,107 B2 | | 5/2010 | Cochran |
| 7,954,372 B2 | | 6/2011 | Brath et al. |
| 7,993,098 B2 * | 8/2011 | Zhou et al. | .................... 415/118 |
| 8,170,810 B2 * | 5/2012 | Volkmer | ........................ 702/41 |
| 8,222,757 B2 * | 7/2012 | Schulten | ........................ 290/44 |
| 2009/0232635 A1 | | 9/2009 | Menke |
| 2010/0256874 A1 | | 10/2010 | Carresjo et al. |
| 2011/0135469 A1 | | 6/2011 | Scholte-Wassink |
| 2011/0150647 A1 * | 6/2011 | Gierlich et al. | .................... 416/1 |
| 2011/0158806 A1 * | 6/2011 | Arms et al. | ..................... 416/31 |
| 2012/0011917 A1 | | 1/2012 | Verbruggen |
| 2012/0025528 A1 | | 2/2012 | Sipila et al. |
| 2012/0035865 A1 | | 2/2012 | Fujioka et al. |
| 2012/0063895 A1 | | 3/2012 | Arocena de la Rua et al. |

OTHER PUBLICATIONS

Electro-Sensors, Inc., spec. sheet for Magnetoresistive Sensors, Models 1102, 932, and 933XP (2012, rev. A).

* cited by examiner

*Primary Examiner* — Lisa Caputo
*Assistant Examiner* — Octavia Davis-Hollington
(74) *Attorney, Agent, or Firm* — Jonathan A. Small

(57) ABSTRACT

A system and method are provided for monitoring the structural integrity of one or more blades in a blade-based device, such as a wind turbine. Physical and electrical (e.g., lightening) sources of damage, wear and the like are considered. Generation of power for sensor and communication circuitry may be integrated into the system. Timely and cost-effective repair of any structural or weather-related damage or other issues may be provided, thereby improving operating efficiency and safety of blade-based devices.

22 Claims, 5 Drawing Sheets

BLADE CONDITION MONITORING SYSTEM

BACKGROUND

The disclosure is directed to rotating structures where monitoring the structure status can improve reliability and reduce down-time and maintenance cost. The disclosure is directed particularly to structures that generate energy from the flow of gases or liquids, such as wind turbines. The disclosed technology can be applied to other rotating members that may need to be monitored such as aircraft propeller blades and turbine fan blades, or centrifuge arms. The disclosed technology can also be applied to non-rotating structures or bodies under stress or load such as a tall building or the mast of a boat.

Wind turbines form an important part of a balanced energy strategy. Many wind turbine blades are made by hand out of fiberglass. If not properly manufactured, after few months of operation they may begin to develop cracks at weak spots in the blade. These cracks are initially small, and if detected can be repaired on site with little cost, with the blade still mounted on the turbine. If the crack is not repaired promptly, the crack becomes larger until the blade ultimately fails (e.g., breaks). Once a blade fails, the turbine must be taken out of service, until a new blade can be transported to the site and installed, which is very expensive. Prompt detection of turbine blade cracks is therefore important for economical operation of wind turbine energy facilities.

Blade balance is also very important when operating wind turbines. Typically on each turbine there are multiple (e.g., three) blades, which should be balanced prior to installation to prevent any excessive unwanted loads or forces on the main shaft and the gearbox. Damage to the gearbox due to blade imbalance is gradual and will result in excessive gearbox wear within a few months of operation. Wind turbulence and turbine yaw also will have an adverse effect on the gearbox. Blade imbalance can also occur due to local weather conditions, for example due to imbalanced ice or snow accumulation on one or more blades. As turbine down time and gearbox repair is very expensive, early detection of blade imbalance and the application of corrective action to balance the blades are important to prevent problems with the wind turbine.

Lightning strikes also form a hazard for wind turbine blades, and detection of lightning strikes also allows for more efficient and cost-effective turbine blade maintenance. Shock to turbine blades, for example from striking an errant bird, wind-borne debris, and so on are also a risk.

Early identification of risks such as blade imbalance, lightning strikes, and mechanical shocks is crucial to safe, efficient, and cost-effective operation. However, blades rotate around a pivot point, which makes it difficult to provide power to a sensor and receive sensor signals over a wired connection. Effective monitoring of the turbine blades should sense strain on the rotating turbine blades, synchronize measurements with the blade rotation to account for strain effects due to gravitational forces, send data wirelessly to a central location for analysis, and provide a means to remotely power the sensor. Such a monitoring system has not been disclosed in the prior art.

SUMMARY

Accordingly, the present disclosure is directed to systems and methods for addressing the aforementioned shortcomings. One aspect of the present disclosure is directed to monitoring, identifying, and facilitating action to minimize risks associated with latent blade damage. Wind turbine blades may be formed from large pieces of fiberglass, which are expensive to transport and to install due to their large size, and expensive to repair if they break. Stress-induced cracks can form in the turbine blade, which leads over time to extensive blade damage. However, these cracks are relatively inexpensive to repair if caught early and while they are still small.

According to an aspect of the present disclosure, a low cost, real-time blade damage monitoring system and method is disclosed. The system and method can detect problems such as cracks, imbalance, shock, lightning strikes, and so on in or to turbine blades, and allow these problems to be addressed quickly before more extensive damage occurs to the turbine blade. It is essential that the monitoring system be able to detect cracks and excessive blade imbalance before significant damage is done to the turbine system.

According to another aspect of the present disclosure, methods and systems are disclosed for turbine blade characterization. The characterization may be based on one or more of: detecting and measuring blade micro strains, blade torsion, blade shocks, lightning strikes, and blade position.

According to a still further aspect of the present disclosure, blade characterization may be synchronized with blade position to modulate sensor and transmitter power. Increased sensor and transmitter power source lifespan may be provided.

According to yet another aspect of the present disclosure, power for operating blade condition sensors, transmitters/receivers, and processing devices may be locally generated. Such an arrangement reduces maintenance requirements for such components, thereby reducing operating cost both of the monitoring devices and of the turbine system as a whole.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

The features and advantages of the present disclosure are described and will be apparent to those skilled in art from the following detailed description taken together with the accompanying figures, in which like reference numerals in the various figures denote like elements. The figures are not to scale.

DETAILED DESCRIPTION

Various embodiments of the present disclosure will now be described in detail with reference to examples thereof. However, such examples are merely illustrative, and should not be read as limiting the scope of the present disclosure, or the embodiments thereof, within the boundaries of the claims appended hereto.

We initially point out that description of well known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details.

Figure 1:
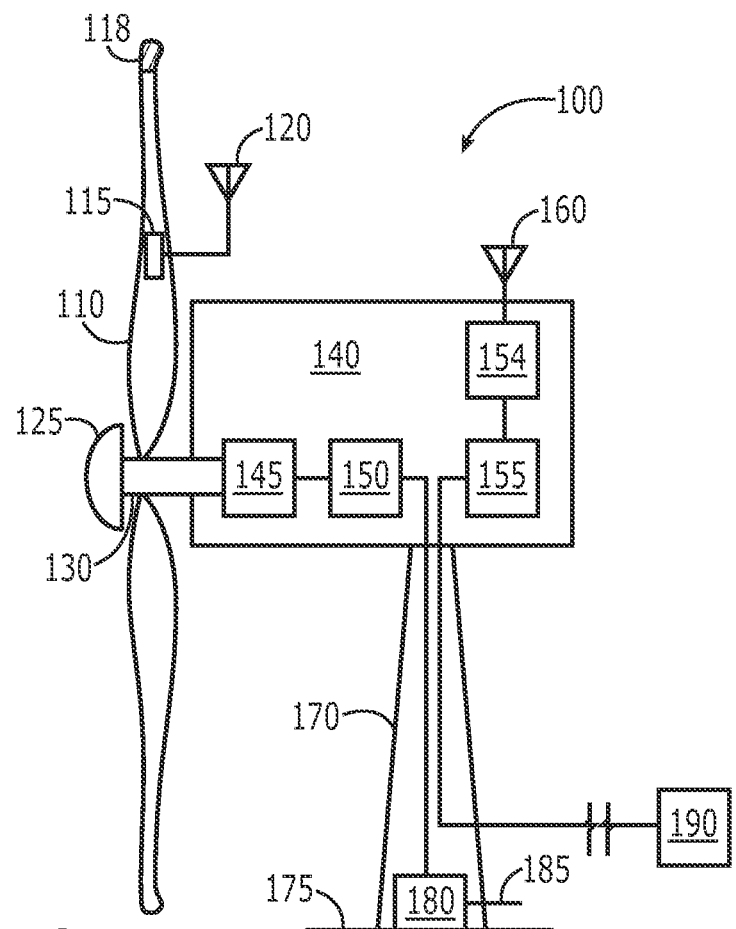
FIG. 1 is an illustration of a wind turbine device and related components in which the systems and methods of the present disclosure may be utilized.

One embodiment of a wind turbine assembly 100 in which the systems and methods of the present disclosure may be utilized is illustrated in FIG. 1. In the exemplary embodiment, two or more wind turbine rotor blades 110 (two blades being shown in FIG. 1) rotate around hub 125 on shaft 130, which is mounted to nacelle 140, which in turn is supported by wind turbine tower 170. Blades 110 are shaped such that the force of the wind causes the blades 110 and shaft 130 to rotate. Shaft 130 drives gearbox 145 and generator 150, producing electrical power. Electrical power is sent down tower 170 in the form of direct current electricity to inverter 180, which converts direct current electricity to alternating current electricity and sends the power to a substation power facility via power lines 185. Tower 170 is mounted to the ground 175, which supports the tower as well as acts as the grounding point for lightning strikes.

One or more sensor circuits 115 are mounted to each one or more of blades 110, and monitor the status and health of the blades of wind turbine 100. Details of sensor circuit 115 and other elements are shown only in situ for one of the blades 110 in FIG. 1, but it will be understood that each blade 110 may be similarly equipped with sensor circuit 115 and other elements disclosed herein. In the exemplary embodiment, sensor circuit 115 includes a thin piezo-electric film sensor, which measures micro strains and torsional strain, which are the strain resulting from bending and twisting force applied to blades 110. This piezo-electric film is very flat, and measures micro strains when it bends, and measures torsion when it twists.

Each sensor circuit 115 is coupled to a transmitter for wirelessly transmitting sensed strain data to a processing unit for determining blade condition. According to one embodiment of the present disclosure, sensor circuits 115 transmit sensor data using a wireless link (e.g., radio-frequency, Bluetooth, etc.) via antennae 120, 160, and receiver 154 to turbine control unit 155 located in nacelle 140 for analysis. The elements comprising sensor circuit 115 are discussed below with reference to FIG. 4.

Typical applications will provide between one and three sensor circuits 115 per turbine blade 110. A larger number of sensors per blade provide more comprehensive strain data for analysis, while a smaller number of sensors minimize the cost of the monitoring system.

According to another embodiment of the present disclosure, sensor circuit 115 is connected to an electrical power generator to enable the measurement and transmission of sensor data. Alternatively, each sensor circuit 115 may be connected to a replaceable power source in other embodiments, or sensor power may be provided from nacelle 140.

Turbine blades 110 have conductive end caps 118 at their outermost ends, connected to a lightning rod that in turn is connected to ground to minimize the damage to the blade from a lightning strike, as is known in the existing art.

Turbine control unit 155 housed inside nacelle 140 uses antenna 160 and receiver 154 to receive information about each blade 110 from its attached blade sensor circuit 115. In the preferred embodiment, receiver 154 is a commercial component such as the RX-RM-AUDIO superheterodyne receiver module from ABACOM Technologies (Ontario, Canada).

Information received by turbine control unit 155 includes the analog voltage corresponding to the micro strains and torsion measured on each blade 110 by the attached sensor 115, and the position of the blade 110 where the data was taken. This information is used to analyze the condition of each turbine rotor blade 110. The strain data from blade 110 is converted to a frequency domain representation, for example by Fast Fourier Transform (FFT), and is sent, again for example, according to a known internet protocol (IP) address via a standard TCP/IP data format to central computer 190 for analysis, along with other analog signals from accelerometers and other data collection devices connected on the gearbox and the generator. In an alternate embodiment, data from sensor circuits 115 are analyzed by the turbine control unit, and alarm data sent to central computer 190 when measured data from sensor circuits 115 exceed parameters expected for safe operation.

Central computer 190 analyzes the frequency-domain Fourier-transform representation of the strain spectrum from sensor 115. This spectral analysis allows static strain effects that have a low-frequency component to be distinguished from high-frequency energy resulting from environmental and other external source such as the thunder following a lightning strike. The collected data can be averaged over many rotations of the blade 110 to filter out transient noise signals such as wind noise or blade vibration.

To simplify measurements and understand the conditions of measurement, it is best to take the measurements under certain specified conditions. In one embodiment, the conditions are defined for the blade position to be pointing upward (0 deg angle) and pointing downward (180 degree angle). In a three-blade system under normal conditions, the three identical, healthy and balance blades 110 rotate at about 8 to 15 revolutions per minute, so the time of measurement between each blade is less than a second. If the blades are identical, their micro strain measurements and corresponding Fourier transforms of this data will be very similar. If one blade is damaged, it will display a difference compared to other two blades, triggering an alarm at central computer 190.

Figure 2:
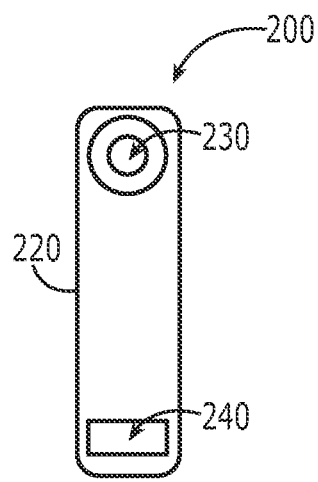
FIG. 2 is an illustration of a blade position sensor for synchronizing data collection with turbine blade position according to an embodiment of the present disclosure.

According to one embodiment of the present disclosure, the position detection is done by proximity condition of a reed relay and a magnet. With reference to FIG. 2, when magnet 240 passes by the reed relay (not shown), it energizes the relay and contacts are closed to command the measurements. The relay rotates with the blade. The magnet 240 is attached to one end of a bar 220. A bearing 230 is secured to bar 220 opposite magnet 240. The bar and the ball bearing act like a pendulum or plumb bob and magnet 240 always points downward (due to gravity) as the blade rotates.

Figure 3A:
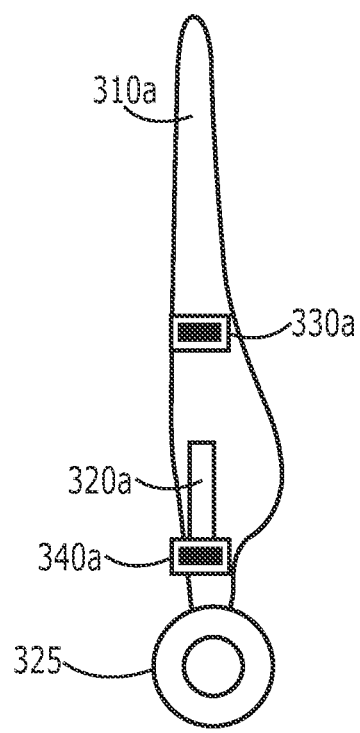
FIGS. 3A and 3B are illustrations of operation of the blade position sensor in two distinct turbine blade positions, respectively, according to an embodiment of the present disclosure.
Figure 3B:
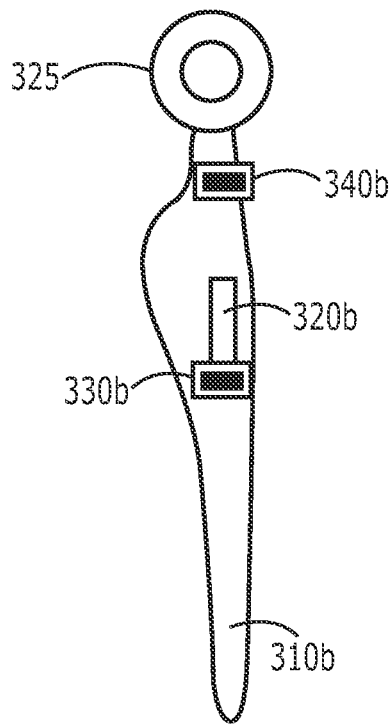

FIGS. 3A and 3B show two positions, respectively, of two turbine blades 310*a*, 310*b*. Blade 310*a* is shown in the straight up (0 deg) position, and blade 310*b* in the straight down (180 deg) position. While shown separately, each of blades 310*a*, 310*b* rotate around hub 325. Blade position detector 320*a* is shown in association with blade 310a in the straight up position and blade position detector 320b is shown in association with blade 310b in the straight down position, but again in practice these are the same, single blade position detector 320.

With blade 310a in the straight up position, the magnet of blade position detector 320a overlaps with sensor 340a but not sensor 330a, signaling turbine control unit 115 that blade 110 is straight up. Conversely, with blade 310b in the straight down position, the magnet of blade position detector 320b overlaps with sensor 330b but not sensor 340b, signaling turbine control unit 155 that blade 110 is straight down. Sensors 340a and 330b are used to trigger data acquisition of sensor circuit 115 (FIG. 1), and to power down sensor circuit 115 after data acquisition. While a gravity and magnet system has been described above for blade position determination, many other methods of sensing orientation, such as optical sensors, and the like, are also contemplated hereby.

Figure 4:
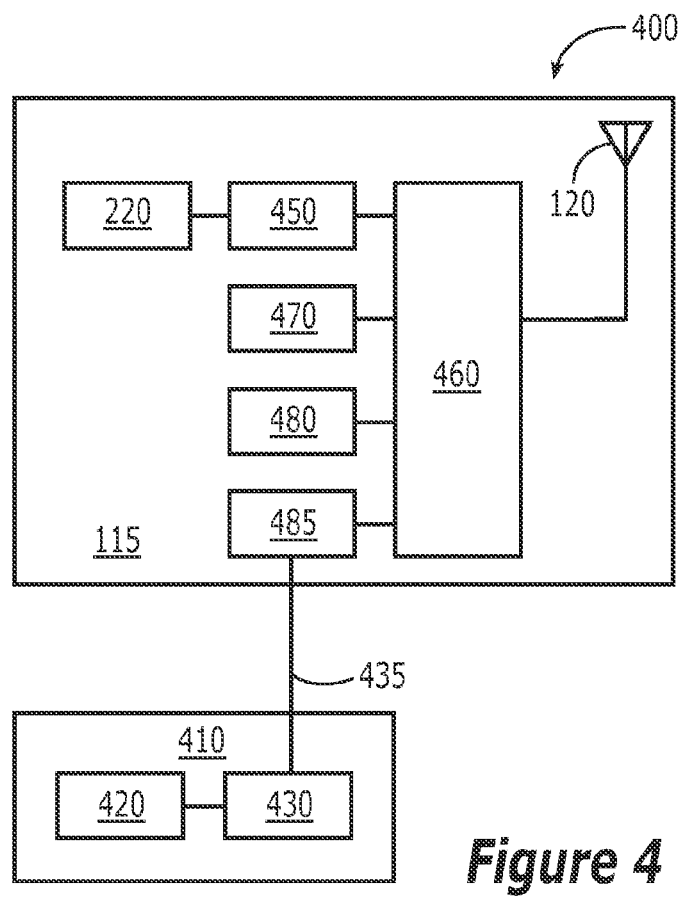
FIG. 4 is a block diagram of a blade sensor system according to an embodiment of the present disclosure.

FIG. 4 shows a block diagram of a blade sensor system 400 according to one embodiment of the present disclosure, which includes sensor circuit 115 and autonomous power supply 410. In a preferred embodiment, blade sensor 480 is part number DT4-028 K from Measurement specialties (www.meas-spec.com), a 0.86"×6.72" strain sensor that is 40 micro meter thick.

According to an embodiment of the present disclosure, autonomous power supply 410 supplies power locally to sensor circuit 115, and is comprised of power generator 420 and power regulator 430, with power output 435. The rotation of blade 110 (FIG. 1) will cause the movement of a magnet inside a coil and thus generates power from output 435 to the rest of blade sensor circuit 115, as discussed further below.

Blade position detector 220 detects the position of the rotating turbine blades in the vertically up (zero degrees) and vertically down (180 degrees) position.

Adjustable timer 450 sets the measurement interval following a trigger signal from blade position detector 220. When a blade 110 is in the vertically up or vertically down position it will trigger timer 450 to turn transmitter 460 on for a certain duration of time. This duration of time is important for calculation of number of samples and maximum frequency of the signal for the FFT transformation into frequency domain.

Multiple blade sensor circuits 115 transmit status information to turbine control unit 155. To identify which blade is sending the information, blade designator 470 provides a unique digital signature enabling turbine control unit 155 to determine the source of each signal. An oscillator at a known frequency representing the number of the blade sensor circuit 115 (e.g., blade 1→1 KHz, blade 2→2 KHz, etc.) is connected to the transmitter 460 for identification of signals from each sensor circuit 115.

Piezo-electric sensor 480 converts the micro strain and torsional strain into voltage and supplies the strain data to transmitter 460, which sends the data via antenna 120 to turbine control unit 155. Since sensors 470 are close to one another, in the case of independent blade pitch control, multiple strain sensors 480 can be connected to one transmitter and power supply. Alternately, piezo-electric strain sensor 480 may be replaced or augmented with a Bragg grating or other fiber optic sensor, strain gauge sensor, accelerometer, velocity sensor, velometer and proximity probes or other known means of sensing physical integrity of the blade.

Figure 8:
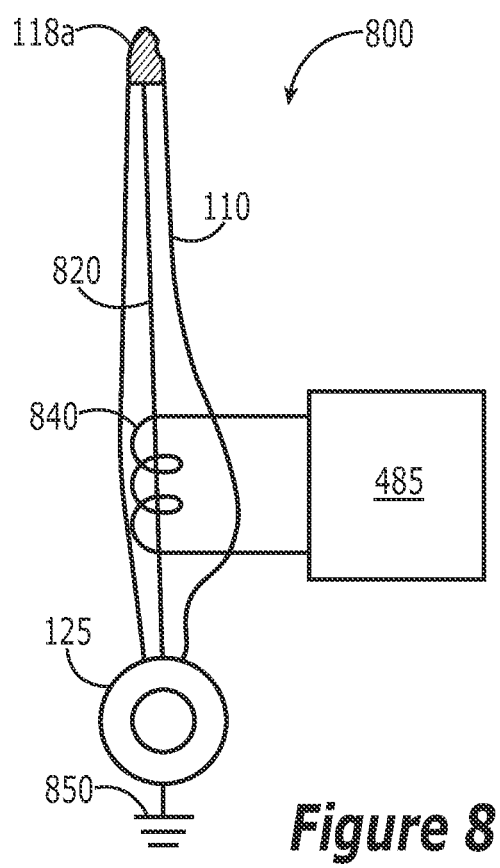
FIG. 8 is a schematic diagram illustrating the operation of lightning suppression and lightning detection according to an embodiment of the present disclosure.

Lightning sensor 485 senses current flow from conductive end cap 118 which results from a lightning strike to blade 110 through conductive rod 820 (shown in FIG. 8).

In the exemplary embodiment, transmitter 460 is a TX-FM-RADIO commercial integrated circuit by ABACOM Technologies (Ontario, Canada). In the exemplary embodiment transmitter antenna 120 is a helical antenna consisting of enameled copper wire with a diameter of 0.5 mm closely wound on a 3.2 mm diameter form. Transmitter antenna 120 is implemented with 26 turns of wire if transmitting at a center frequency of 418 MHz center frequency, or 24 turns of wire if transmitting at a center frequency of 433 MHz. Alternately, transmitter 460 may be implemented using an infrared optical source or other known means of data transmission. Communication from blade sensor 115 to turbine control unit 115 may or may not be limited to wireless, hard wired, Ethernet, or other known communication means. The sensor signal could be routed from blade 110 through a slip ring to nacelle 140, or use other known signal routing means.

Figure 5:
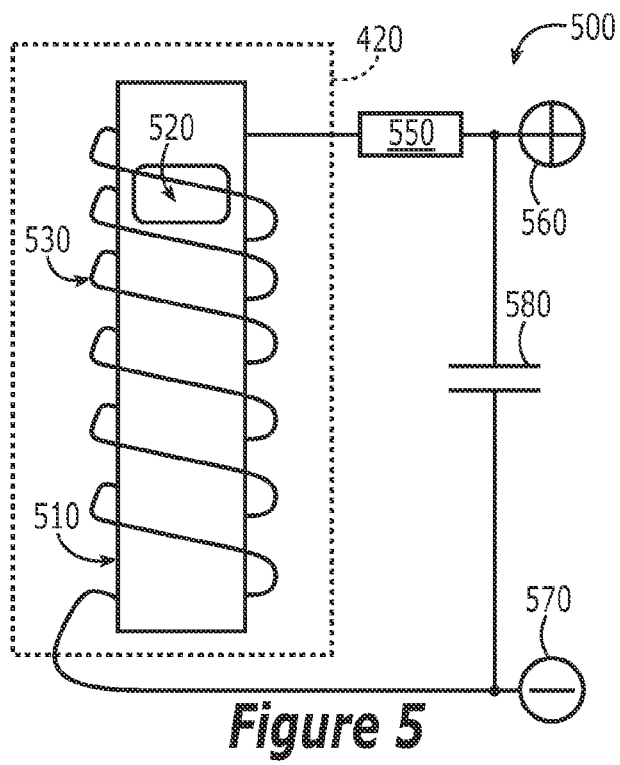
FIG. 5 is a schematic diagram of a power generator used to power a blade sensor according to an embodiment of the present disclosure.

Details of power generator 420 are shown in FIG. 5. Power generator 420 is made of a plastic tube 510 about 15 cm long with a permanent magnet 520 that can easily slide up and down inside the tube. The outside of the tube 510 is a wire coil 530 wound with many turns of small gauge wire. This tube 510 is installed tangential to the direction of the rotation of blade 110.

The size and weight of the various components of power generator 420 are selected such that as blade 110 rotates, permanent magnet 520 moves up and down in the tube 510 by the pull of gravity (overcoming centrifugal force from the blade rotation). This up and down motion of magnet 520 within coil 530 generates electrical current to supply sensor 115 and to charge capacitor 580 for energy storage. Alternately, power generator 420 may be implemented using motion driven power, battery power, solar power, nuclear power, controller/scada driven power, thermal power, or other known means of power generation. Alternately power may be supplied externally via a hard-wired external power source, for example via nacelle 140. Capacitor 580 may be augmented or replaced with a battery or other known means of power storage.

When the wind turbine is not operating, current sensor 550 will not detect any charging current and will turn off transmitter 460 to preserve energy stored in capacitor 580. This simple, small, and lightweight autonomous and independent power generation inside the blade will supply the transmitter without any need for any other source of power.

Figure 6:
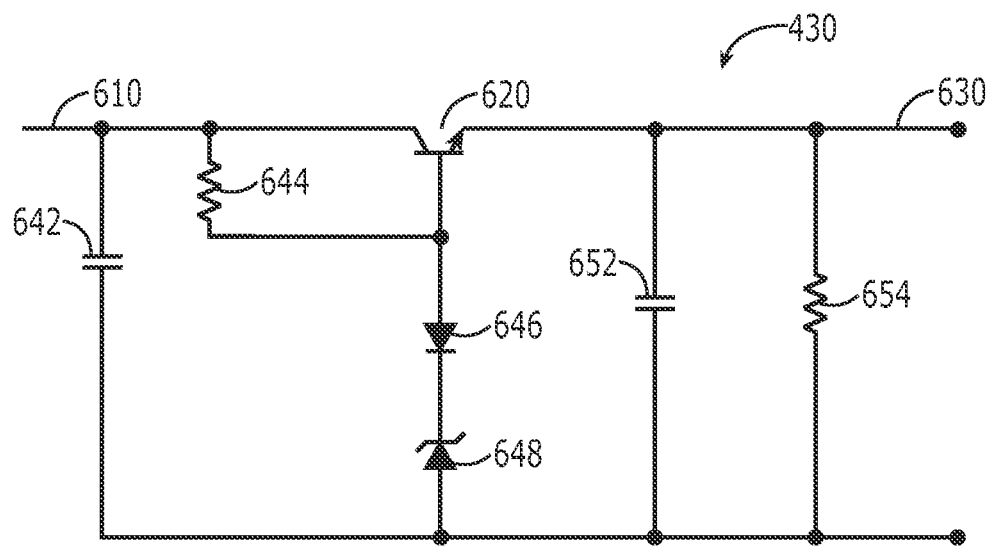
FIG. 6 is a schematic diagram of a regulated power supply which conditions the power received from a power generator according to an embodiment of the present disclosure.

The non-regulated output 560 of power generator 420 is an input 610 to a regulated power supply 430, shown in more detail in FIG. 6. Transistor 620 clamps the output voltage at a fixed value using a bias network comprising two diodes 646 and 648, a resistor 644 and a capacitor 642. The bias current for transistor 620 is provided by output resistor 654, and filtering of output power 630 is provided by capacitor 652. Power regulator 430 also may be implemented with an integrated circuit, or other known method of voltage regulation.

Figure 7:
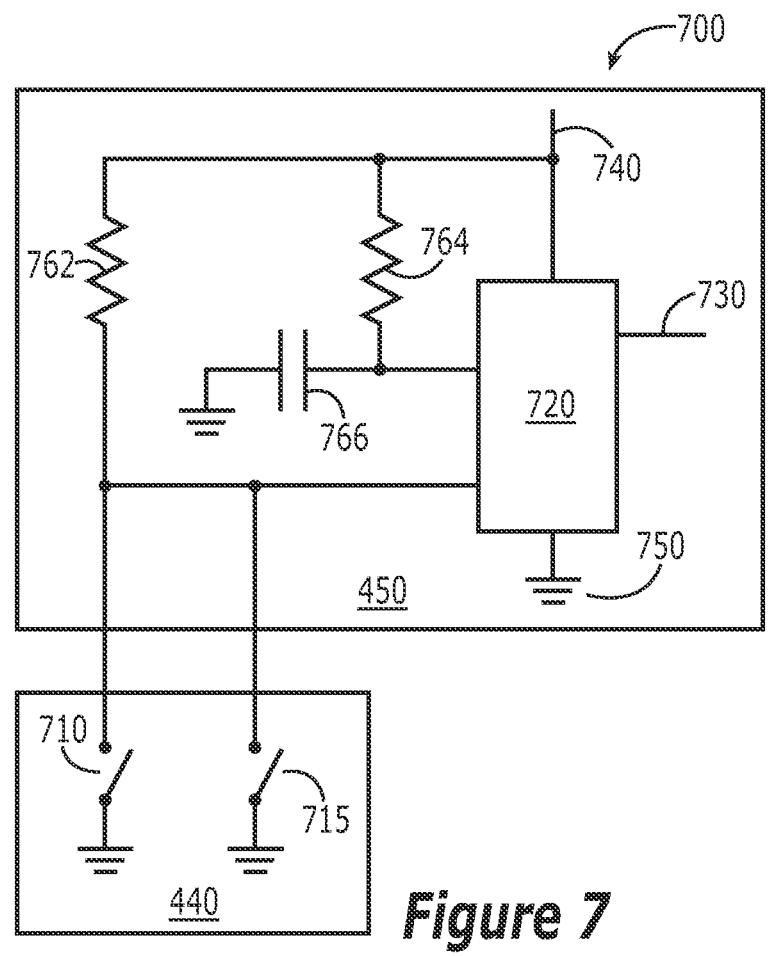
FIG. 7 is a schematic diagram of a combination of blade position detector and timer used to initiate and terminate a strain measurement according to an embodiment of the present disclosure.

The combination of blade position detector 440 and timer 450 are shown in FIG. 7. Blade position detector 440 consists of two switches 710 and 715, each of which is formed by the contacts of a reed relay that temporarily closes once during a full rotation of blade 110. The reed relay was included in the FIG. 2 description, but not shown. Switch 710 is closed when blade 310a is at 0 degree position, and magnet 240 overlaps sensor 340a as shown in FIG. 3. Switch 715 is closed when blade 310b is at 180 degree position, and magnet 240 overlaps sensor 330b as shown in FIG. 3.

Each time blade detection switch 710 or 715 closes, it triggers timer 720 constructed using an LM555 integrated circuit (or similar), which generates a 500 ms timing pulse at output 730, during which time data is collected from sensor 115. Timer 720 has a power source 740 and pull-up resistor 762 for bias, and a combination of resistor 764 and capacitor 766 that sets the duration of the timing pulse. Timer 720 is also connected to power voltage 740 and ground 750. Alternately, blade position detector 440 may be implemented using a shaft encoder, tachometer, or other known means of rotation measurement. A trigger may or may not be used to activate measurements for the purpose of comparable phasing and possibly pitch. This trigger may be laser, optic, magnetic, electronic, or scada based.

The lightning protection operation of conductive end cap 118 and lightning sensor 485 is further illustrated in FIG. 8. Under ideal circumstances, a lightning strike to blade 110 will occur at conductive end cap 118. The lightning strike produces electrical current, which flows down rod 820 through the center of blade 110, to hub 125 to ground 850. As a result of the current through rod 820, an electrical voltage is produced in coil 840, which is wrapped around rod 820. This resulting voltage is sensed by lightning sensor 485, and a signal is sent to central computer 190 that a lightning strike occurred in blade 110. Data analysis is performed, and a repair operator is notified if a potentially unsafe condition exists.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way.

Furthermore, various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A system facilitating action to minimize operational risk associated with latent blade damage in a bladed turbine, comprising:
    a sensor, disposed on or within a rotating blade, for measuring strain on said rotating blade;
    a sensor, disposed on or within said rotating blade, for measuring position of said rotating blade;
    a wireless data link for transmitting data representing the measured strain to a remote location;
    a system for synchronizing the collection of torsional strain data by said sensor for measuring strain to blade position as determined by said sensor for measuring position of the rotating blade such that said torsional strain data is collected only at predetermined positions of said rotating blade; and
    a control element, having stored therein safe blade operation parameters, and configured to analyze operational condition of the rotating blade based on said synchronized torsional strain data and blade position over multiple rotational cycles of the rotating blade and compare said operational condition to said safe blade operation parameters, said control element further configured to trigger a predetermined action when said operational condition is determined to be other than within said safe blade operation parameters.

2. The measurement system of claim 1, further comprising a mechanism for powering the sensor and data link by way of rotation of the rotating blade.

3. The measurement system of claim 2, wherein said mechanism for powering the sensor and data link comprises a magnet moving through a wire coil due to the rotation of the wind turbine blade to generate electricity.

4. An apparatus facilitating action to minimize operational risk associated with latent blade damage in a multi-blade rotating-blade system, comprising:
    a piezo-electric sensor disposed either within or upon a rotating blade of said rotating-blade system for measuring strain on said blade;
    a sensor for measuring position of said blade;
    a measurement synchronization system for synchronizing the collection of strain data from said piezo-electric sensor to the position of the blade as measured by said sensor for measuring position, such that said strain is measured only at predetermined positions of said rotating blade;
    a wireless data link for transmitting data representing the measured strain to a remote location;
    a mechanism for harvesting energy from the rotating blade, coupled to the sensor, measurement synchronization system, and wireless data link to provide power thereto; and
    a control element, having stored therein safe blade operation parameters, and configured to analyze operational condition of the blade based on said strain data and blade position over multiple rotational cycles of the blade and compare said operational condition to said safe blade operation parameters, said control element further configured to trigger a predetermined action when said operational condition is determined to be other than within said safe blade operation parameters.

5. The measurement system of claim 4, wherein the rotating blade is used for generating power from the movement of a gas.

6. The measurement system of claim 4, further comprising:
    a circuit for determining if the rotating blade has been struck by lightning, and further for determining the magnitude of the strike if it is determined that the blade has been so struck; and
    a control element, having stored therein additional safe blade operation parameters, and configured to analyze operational condition of the blade based on said magnitude of said lightning strike, said control element further configured to trigger a predetermined action when said operational condition is determined to be other than with said additional safe blade operation parameters based on said magnitude of said lightning strike.

7. The measurement system of claim 4, wherein the sensor for measuring strain measures torsional strain.

8. The measurement system of claim 4, wherein the wireless data link transmits data using a radio frequency signal.

9. The measurement system of claim 4, wherein the wireless data link transmits data using an optical signal.

10. The measurement system of claim 4, wherein the mechanism that harvests energy generates energy from the blade rotation.

11. The measurement system of claim 10, wherein energy is harvested from blade rotation using a magnet moving as a result of blade rotation, which generates current in a wire due to a time varying magnetic field.

12. The measurement system of claim 10, further comprising a power management system for reducing power during a portion of an interval of blade rotation.

13. A method of monitoring structural integrity of rotating turbine blades to minimize operational risk associated with latent blade damage in a bladed turbine, comprising:
measuring strain on a rotating blade by way of a strain sensor disposed on or within said blade;
measuring position of said rotating blade by way of a position sensor disposed on or within said blade;
synchronizing the strain measurement from said strain sensor and data transmission to the rotation of the turbine blade using said position sensor such that said strain is measured only at predetermined positions of said rotating blade;
transmitting data representing the measured strain to a remote location using a wireless data link; and
based on said transmitted data, providing an alert if the data indicates the measured strain exceeds a threshold value.

14. The method of claim 13, further comprising:
harvesting energy from the rotating blade; and
powering the strain measurement and wireless data link transmitter using energy harvested from the rotating blade.

15. The method of claim 13, wherein the rotating blade is used for generating power from the movement of a gas.

16. The method of claim 13, further comprising a circuit for determining if the rotating blade has been struck by lightning, for determining the magnitude of the strike if it is determined that the blade has been so struck, and for providing an alert if the determined magnitude of the strike exceeds a threshold value.

17. The method of claim 13, wherein said measuring of strain further comprises measuring torsional strain on said rotating blade.

18. The method of claim 13, further comprising measuring the torsional strain of the rotating blade using a piezo-electric strain sensor.

19. The method of claim 13, further comprising sending the data representing strain over the wireless data link using a radio frequency signal.

20. The method of claim 13, wherein the energy harvested from the rotating blade is provided by energy from the blade rotation.

21. The method of claim 20, where energy is harvested from blade rotation using a magnet moving as a result of blade rotation, which generates current in a wire due to a time varying magnetic field.

22. The method of claim 13, further comprising reducing electrical power used for strain measurement and transmission during a portion of an interval of blade rotation.

* * * * *